US012313726B2

(12) United States Patent
Fay et al.

(10) Patent No.: US 12,313,726 B2
(45) Date of Patent: May 27, 2025

(54) MODULAR ARCHITECTURE FOR ASYNCHRONOUS LATE-FUSION OF OBJECTS

(71) Applicant: Rivian IP Holdings, LLC, Irvine, CA (US)

(72) Inventors: Gary Fay, Hermosa Beach, CA (US); Aziz Umit Batur, Torrance, CA (US); Sowmya Gade, Redwood City, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 302 days.

(21) Appl. No.: 17/721,917

(22) Filed: Apr. 15, 2022

(65) Prior Publication Data

US 2023/0074275 A1 Mar. 9, 2023

Related U.S. Application Data (60) Provisional application No. 63/240,552, filed on Sep. 3, 2021.

(51) Int. Cl.
*G01S 13/86* (2006.01)

(52) U.S. Cl.
CPC ............ *G01S 13/86* (2013.01); *G01S 13/865* (2013.01); *G01S 13/867* (2013.01)

(58) Field of Classification Search
None
See application file for complete search history.

(56) References Cited

U.S. PATENT DOCUMENTS

| 7,009,554 B1* | 3/2006 | Mookerjee | G01S 13/878 342/195 |
| 8,260,052 B1* | 9/2012 | Scannell | G01S 13/86 382/181 |
| 2009/0135065 A1* | 5/2009 | Tsuchida | G01S 13/931 342/450 |
| 2017/0371338 A1* | 12/2017 | Kamata | G05D 1/024 |
| 2019/0391254 A1* | 12/2019 | Asghar | G01S 13/867 |
| 2020/0226434 A1* | 7/2020 | Li | G06F 17/16 |
| 2022/0083825 A1* | 3/2022 | Han | G06F 18/256 |

OTHER PUBLICATIONS

D. L. Hall and J. Llinas, "An introduction to multisensor data fusion," in Proceedings of the IEEE, vol. 85, No. 1, pp. 6-23, Jan. 1997, doi: 10.1109/5.554205. (Year: 1997).*

* cited by examiner

*Primary Examiner* — Bernarr E Gregory
(74) *Attorney, Agent, or Firm* — Haley Guiliano LLP (57) ABSTRACT

Systems and methods for asynchronous late-fusion of measurements. State information and intermediate values may be calculated as measurements arrive and are stored. When late sensor measurements arrive out of the temporal order in which the measurements were generated, the late measurements are stored in temporal order rather than the order in which measurements arrive. State information is then recalculated to account for the late-arriving sensor measurement, with state outputs propagated forward in temporal order using the previously computed intermediate values to speed up computation. In this manner, more accurate revised state information is efficiently generated, accounting for any late-arriving measurements. This modular processing framework also enables sensors to be added or changed, which may cause measurements to arrive asynchronously, without having to reprogram the processing framework.

20 Claims, 8 Drawing Sheets

MODULAR ARCHITECTURE FOR ASYNCHRONOUS LATE-FUSION OF OBJECTS

CROSS-REFERENCE TO RELATED APPLICATIONS

This application claims priority to U.S. Provisional Patent App. Ser. No. 63/240,552, filed on Sep. 3, 2021, the entire contents of which are hereby expressly incorporated by reference in their entirety.

INTRODUCTION

The present disclosure is directed generally to autonomous navigation. More specifically, the present disclosure is directed to asynchronous late-fusion of objects in applications such as autonomous navigation.

SUMMARY

Applications such as autonomous navigation often rely on object fusion and other methods for accurate detection of objects and vehicle path determination. In particular, vehicles such as autonomous vehicles often employ a number of different sensors to detect nearby objects. While arrays of different sensors may sometimes be effective in object detection, they also present challenges. For example, individual sensors such as those employed in advanced driver assistance systems (ADAS) may vary in their operational timing, such that some measurements may arrive after certain outputs are calculated. As a result, calculated state information may be based on incomplete or outdated sensor measurements, reducing accuracy and reliability of applications such as autonomous navigation.

Accordingly, systems and methods are disclosed herein for performing processing of sensor data such as ADAS sensor measurements, where these measurements arrive out of order and asynchronously, in a modular fashion that does not require significant process changes for differing sensors and sensor timing. Sensor measurements may arrive in asynchronous manner and are rearranged in temporal order. State information may then be recalculated after rearrangement. For example, a system may calculate state information, such as states of objects surrounding a vehicle, e.g., object shapes, positions, velocities, accelerations, headings, pitch, and the like, as vehicle sensor information is received. Subsequently, a late sensor measurement may arrive, with a time index prior to some other earlier-received measurements. This may happen when, for example, some sensors are delayed in transmitting their measurements due to, e.g., lag, high computational overhead, or the like. State information may be recalculated from the late sensor measurements, and any temporally earlier sensor measurements and previously calculated intermediate values, to account for the correct time at which the late sensor measurements were made. That is, previously calculated state information is recalculated to account for late-arriving sensor measurements. This revised state information may then be used for any desired purpose. It will be understood that in some embodiments, state information is determined by one or more intermediate values, which refer to values that do not change when a late measurement is received. Intermediate values are stored from one measurement to the next and do not change even if a late measurement is inserted, which speeds up recomputing equations described in the present disclosure. As described above, state information may describe an object's position, heading, pitch, velocity, acceleration, etc. Certain equations (e.g., predicted state estimate, predicted covariance estimate, innovation or measurement residual, innovation or residual covariance, Near-optimal Kalman gain, updated state estimate, and updated covariance estimate) are used to process sensor data, where some of the computed values are intermediate values and the state of an object is defined by variable x. In some embodiments, one or more operations are involved in these equations that include matrix multiplications and inverses to compute. In some embodiments, "state information," "intermediate values," or both "state information" and "intermediate values" may be referred to as "algorithm information."

In some embodiments of the disclosure, late measurements may arrive in a different epoch. That is, state information calculations may be performed within specified epochs of time, and it is possible that late measurements may arrive in a different, later epoch than their associated time index. For example, a group of sensor measurements may have been received during, and have time indices that fall within, a first epoch. Meanwhile, a late sensor measurement may have a time index also falling within the first epoch, but due to some delay may actually arrive during a subsequent second epoch. The late-arriving measurement may then be moved to the appropriate time index of the first epoch, and state information for that first epoch may be recalculated accordingly. It will be understood that the subsequent second epoch may be immediately subsequent to the first epoch or one or more intermediary epochs may occur between the first epoch and the second subsequent epoch.

Various embodiments of the disclosure contemplate any suitable method of storing sensor measurements. In some embodiments, sensor measurements may be stored in a buffer, in temporal order of their time indices. If a late sensor measurement arrives, with a time index earlier than one or more measurements that have already arrived, the measurements with later time indices may be taken out of the buffer, e.g., popped off, the late sensor measurement pushed onto the buffer, and the later measurements pushed back onto the buffer in order of time index. That is, late sensor measurements may be inserted into the buffer in order of their time indices, so that received sensor measurements are stored in temporal order of their time indices, not in order of their arrival. In this manner, even if a late sensor measurement is received with a time index between the indices of two other measurements that are already stored in the buffer, the late sensor measurement is still stored between these two existing measurements.

Sensor measurements may be any measurements, taken from any sensors. In some embodiments of the disclosure, measurements may be from sensors located on or coupled to a vehicle. This includes autonomous vehicles and any sensors that they may employ. For example, measurements may be radio detection and ranging (radar) measurements, or Light Detection and Ranging (LiDAR) measurements. Measurements may also include images from sensors that detect any wavelength of light or other radiation, such as visible light sensors, infrared or ultraviolet light sensors, or the like.

State information may be any information calculated from sensor measurements and describing a state of a detected object, such as position, heading, pitch, velocity, and acceleration. In some embodiments, this state information may include quantities such as object fusion outputs. More specifically, sensor measurements such as images and LiDAR output may be used in object fusion operations, to determine the likelihood of the presence of an object at a particular location. Embodiments of the disclosure contemplate use of any measurements, of any type or types, to determine likelihoods of object presences at particular locations. In addition, any other quantities of interest may be determined from received sensor measurements. Intermediate values may be reused when recalculating the state information when a late sensor measurement is received. The intermediate values may include one or more values determined based on matrix multiplication or an inverse of a matrix (e.g., as part of a Kalman filter).

Systems of embodiments of the disclosure may also calculate any other quantity from sensor measurements or from any calculated state information. As one example, systems may determine occlusion regions associated with determined objects. Once an object is determined from, e.g., one or more object fusion operations, its location and size may be used to determine an associated occlusion region, in which the object is obscuring the view of an observer who is positioned at or near the location of the sensors. Occlusion regions may be used for any purpose, such as preventing object fusion calculations in occlusion regions, conserving compute resources as any objects in occluded regions cannot be seen anyway.

Embodiments of the disclosure further encompass any configuration of a system for performing any measurement fusion and sensor measurement arrangement methods and processes described herein. Embodiments of the disclosure also encompass any object such as a vehicle, incorporating any such systems for performing any measurement fusion and sensor measurement arrangement methods and processes described herein.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for asynchronous late-fusion of measurements. State information, and intermediate values, may be calculated as measurements arrive and are stored. When late sensor measurements arrive out of the temporal order in which the measurements were generated, the late measurements are stored in temporal order rather than the order in which measurements arrive. State information is then recalculated to account for the late-arriving sensor measurement (e.g., reusing one or more previously calculated intermediate values), with state outputs propagated forward in temporal order. In this manner, more accurate revised state information is generated, accounting for any late-arriving measurements.

Figure 1A:
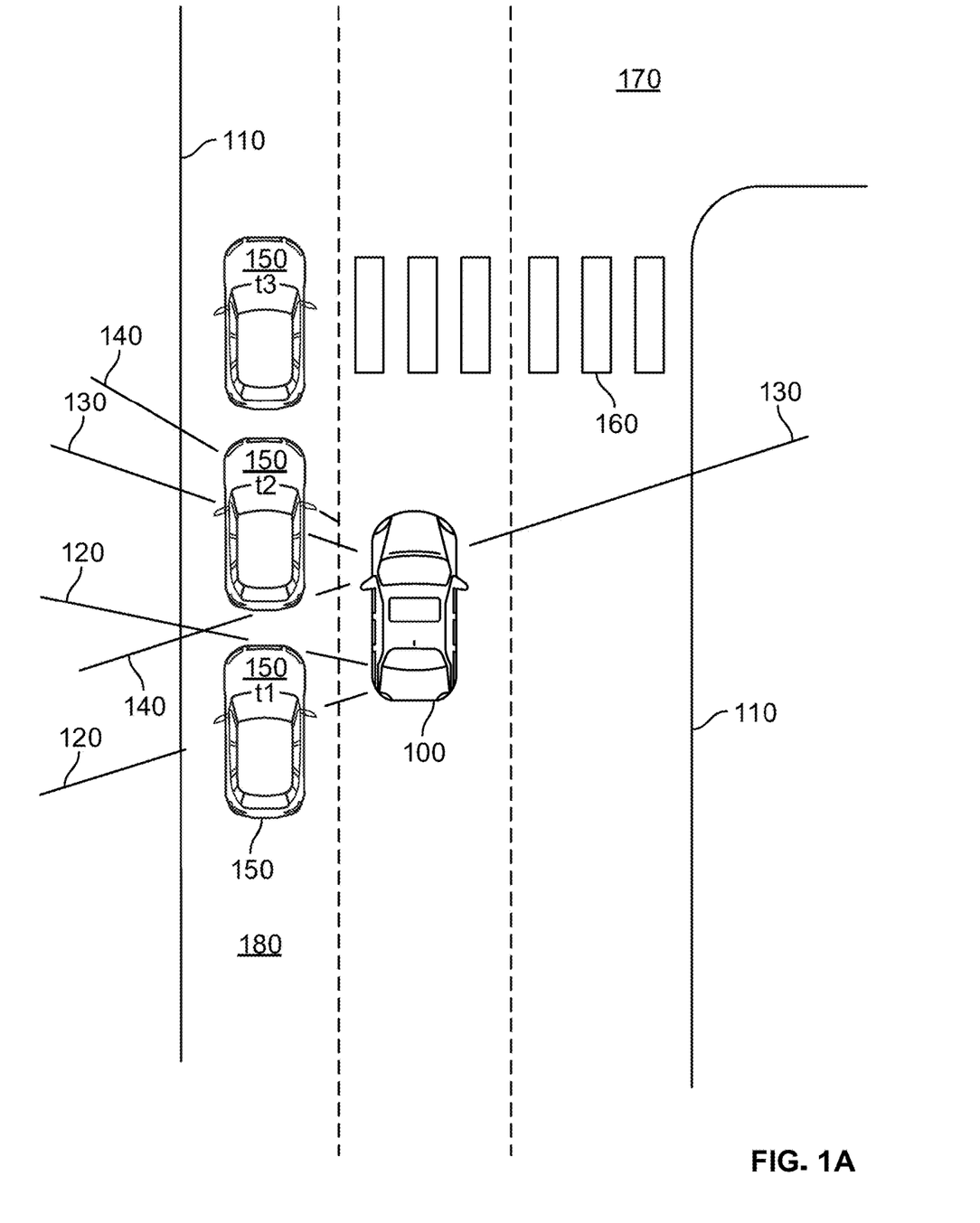
FIG. 1A is a top view of a road and vehicles thereon, conceptually illustrating operation of systems and methods for asynchronous late-fusion of measurements in accordance with embodiments of the disclosure.

FIG. 1A is a top view of a road and vehicles thereon, conceptually illustrating operation of systems and methods for asynchronous late-fusion of measurements in accordance with embodiments of the disclosure. Here, a vehicle 100 may carry a number of onboard sensors with fields of view 120, 130, and 140. The sensors may detect objects such as moving vehicle 150, sidewalk 110, crosswalk 160, and the like, when they enter the sensors' respective fields of view 120, 130, 140. In some embodiments, sensors of vehicle 100 may take measurements at discrete times such as regular intervals. Accordingly, processors of vehicle 100 may receive sensor outputs at regular times. For instance, vehicle 100 may receive measurements taken at time t1 by one or more sensors having field of view 120, when vehicle 150 is within field of view 120. Likewise, vehicle 100 may receive measurements taken at later time t2, from sensors having both fields of view 130 and 140, each showing vehicle 150 after it has moved. At a later time t3, vehicle 100 may receive measurements from sensors with field of view 130, showing vehicle 150 after it has moved further.

In some embodiments, vehicle 100 may perform object fusion operations using the sensor measurements taken at each of times t1-t3. For example, measurements taken from both fields of view 130 and 140 at time t2, as well as position information extrapolated from the location and velocity of vehicle 150 determined at time t1, may be used together to determine quantities such as the likely location of vehicle 150 at time t2.

In some embodiments, sensor measurements may arrive at processors of vehicle 100 asynchronously, but in temporal order at which they were generated. For example, sensor measurements taken at time t1 may arrive before those taken at time t2, which in turn may arrive before those taken at time t3. However, it is possible that some sensor measurements may arrive late, and out of temporal order. For example, due to any number of factors such as lag, processing overhead of certain sensors, or the like, the measurement of vehicle 150 taken by the sensor with field of view 130 at time t2 may arrive after the measurement of vehicle 150 taken by the sensor with field of view 140 at time t3. In this case, rather than simply discarding the late-arriving measurement and calculating the position of vehicle 150 at time t2 without use of the late-arriving measurement taken from field of view 130, embodiments of the disclosure may recalculate the position of vehicle 150 at time t2 once the measurement from field of view 130 arrives. That is, the position of vehicle 150 at time t2 may first be calculated once the measurement of vehicle 150 in field of view 140 taken at time t2 arrives. Next, the position of vehicle 150 at time t3 may also be calculated once the measurement of vehicle 150 in field of view 140 taken at time t3 arrives. Subsequently, the late measurement of vehicle 150 at time t2 in field of view 130 arrives, at which point the position of vehicle 150 at time t2 is recalculated using this late measurement. In some embodiments, this revised position may then be propagated forward, i.e., used to update the position of vehicle 150 at later time t3. This process may further be carried out with any one or more detected objects, to recalculate state information of any detected object, such as the positions, velocities, headings, sizes (e.g., lengths and widths), shapes, etc. of objects such as lane markers of lane 180, crosswalk 160 markers, sidewalks 110, intersection 170, and the like.

Figure 1B:
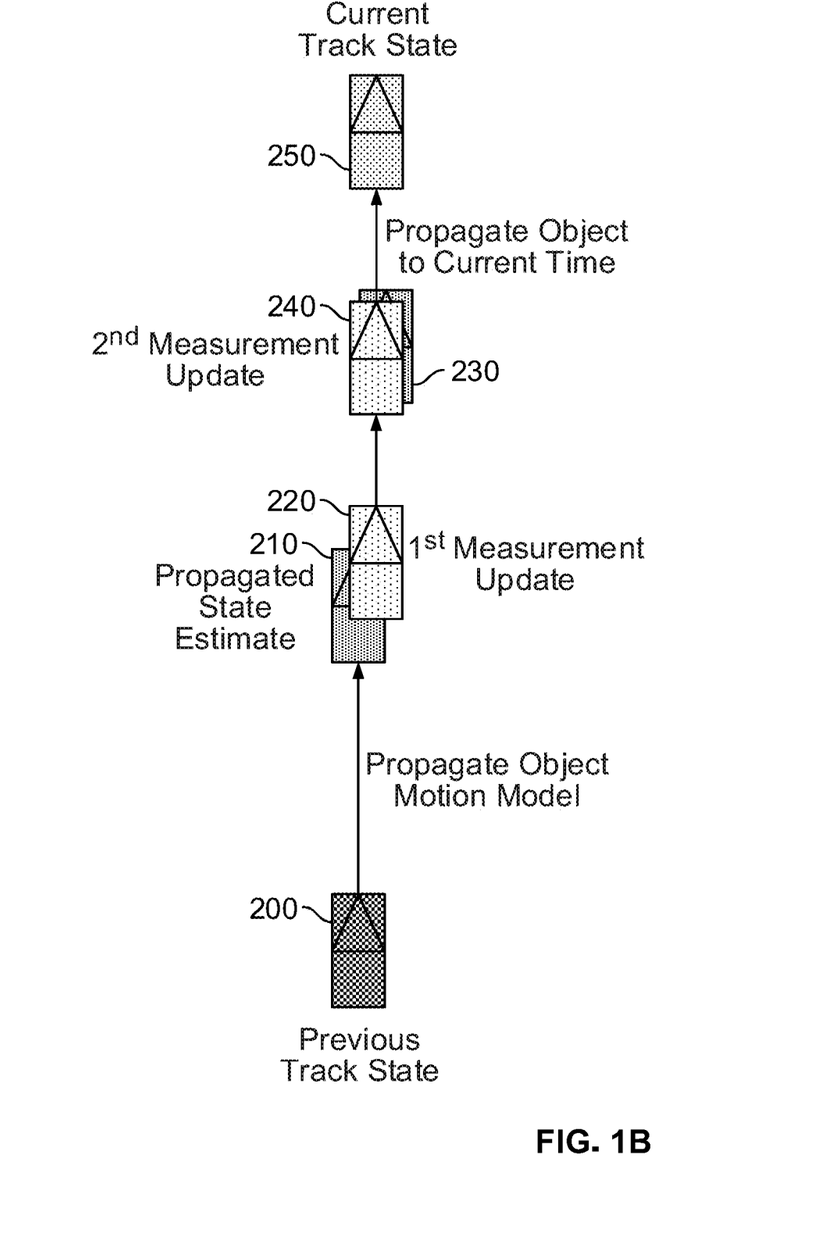
FIG. 1B is a top view of object fusion outputs, conceptually illustrating operation of systems and methods for asynchronous late-fusion of measurements in accordance with embodiments of the disclosure.

FIG. 1B is a top view of object fusion outputs, conceptually illustrating operation of systems and methods for asynchronous late-fusion of measurements in accordance with embodiments of the disclosure. As above, vehicle 100 may measure and track other nearby objects within its field(s) of view, such as vehicle 150. In FIG. 1B, vehicle 200 may be one such tracked object, similar to vehicle 150 of FIG. 1A. In some embodiments of the disclosure, vehicle 200 may have a previous track state as shown, e.g., a determination that an object exists at that location and at that particular time, which may be the state output of a previous set of object fusion operations. The position of vehicle 200 may then be propagated to a subsequent location 210, to account for movement of the object with time. When the next measurement is received, it may be used to calculate the actual location of vehicle 200, i.e., the first measurement update 220. That is, propagated estimate 210 is updated to the first measurement update 220. Subsequently, the vehicle 200 is again propagated to a location 230 to account for movement over time. When a subsequent measurement is received, the actual location of vehicle 200 is again calculated as second measurement update 240. Upon passage of another time increment, vehicle 200 may again be propagated to location estimate 250.

A late-arriving measurement may then be received. For example, a measurement taken at a time between the time of the measurement resulting in update 220, and the time of the measurement resulting in update 240, may arrive late, after calculation of location 250. In this case, a measurement update is calculated between the updates 220 and 240, corresponding to the measured position of vehicle 200 at the time the late-arriving measurement was taken. The measurement update may reuse one or more intermediate values that were calculated and stored during the first calculation of measurement update 240. This measurement update is then propagated to revise location 230 and measurement update 240. In turn, the revised location 230 and update 240 are used to determine a revised location estimate 250. That is, late-arriving measurements are used to recalculate state information at the time the late-arriving measurement was taken or generated, and this recalculated state information may then be propagated to the current or most recent time, improving the accuracy of the present state.

Figure 2:
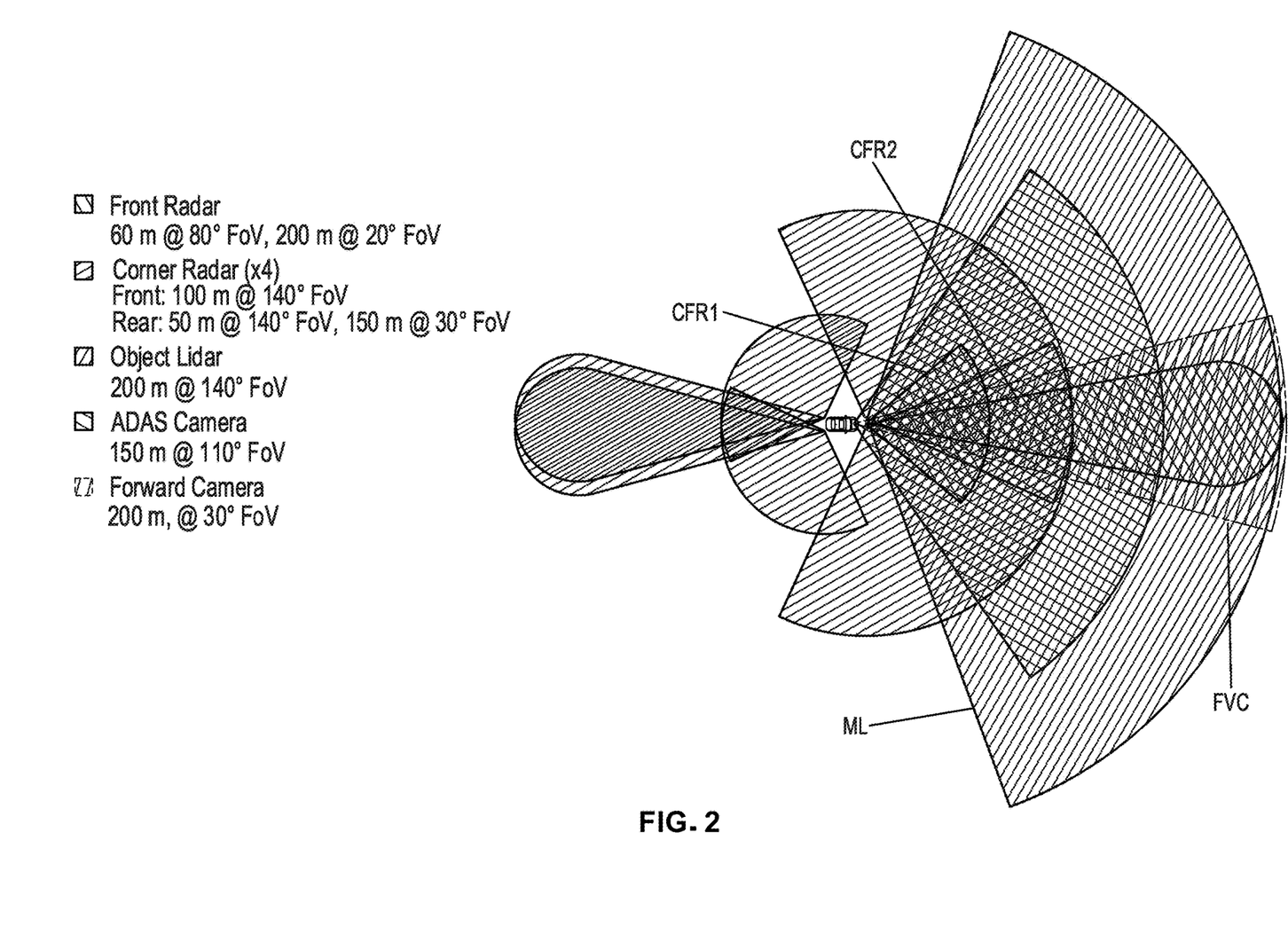
FIG. 2 is a top view of exemplary sensors and their corresponding fields of view, for use in asynchronous late-fusion of measurements in accordance with embodiments of the disclosure.

It is noted that processes of embodiments of the disclosure may be employed in connection with any sensor measurements output by any sensors. For example, processes of embodiments of the disclosure may be employed in connection with outputs of any autonomous or other vehicle sensors. FIG. 2 is a top view of exemplary vehicle sensors and their corresponding fields of view, for use in asynchronous late-fusion of measurements in accordance with embodiments of the disclosure. Here, vehicle sensors may include front radar such as one or more center front radar modules CFR1, CFR2, corner radar, object LiDAR such as a main LiDAR module ML, one or more ADAS or other cameras, and one or more forward vision cameras FVC, each having the fields of view shown. Embodiments of the disclosure encompass any configurations of these sensors, arranged in any manner to have the fields of view shown or other fields of view. Additionally, sensors may include other sensors not shown, such as GPS and inertial measurement unit (IMU) sensors, or any other desired sensors.

Figure 3:
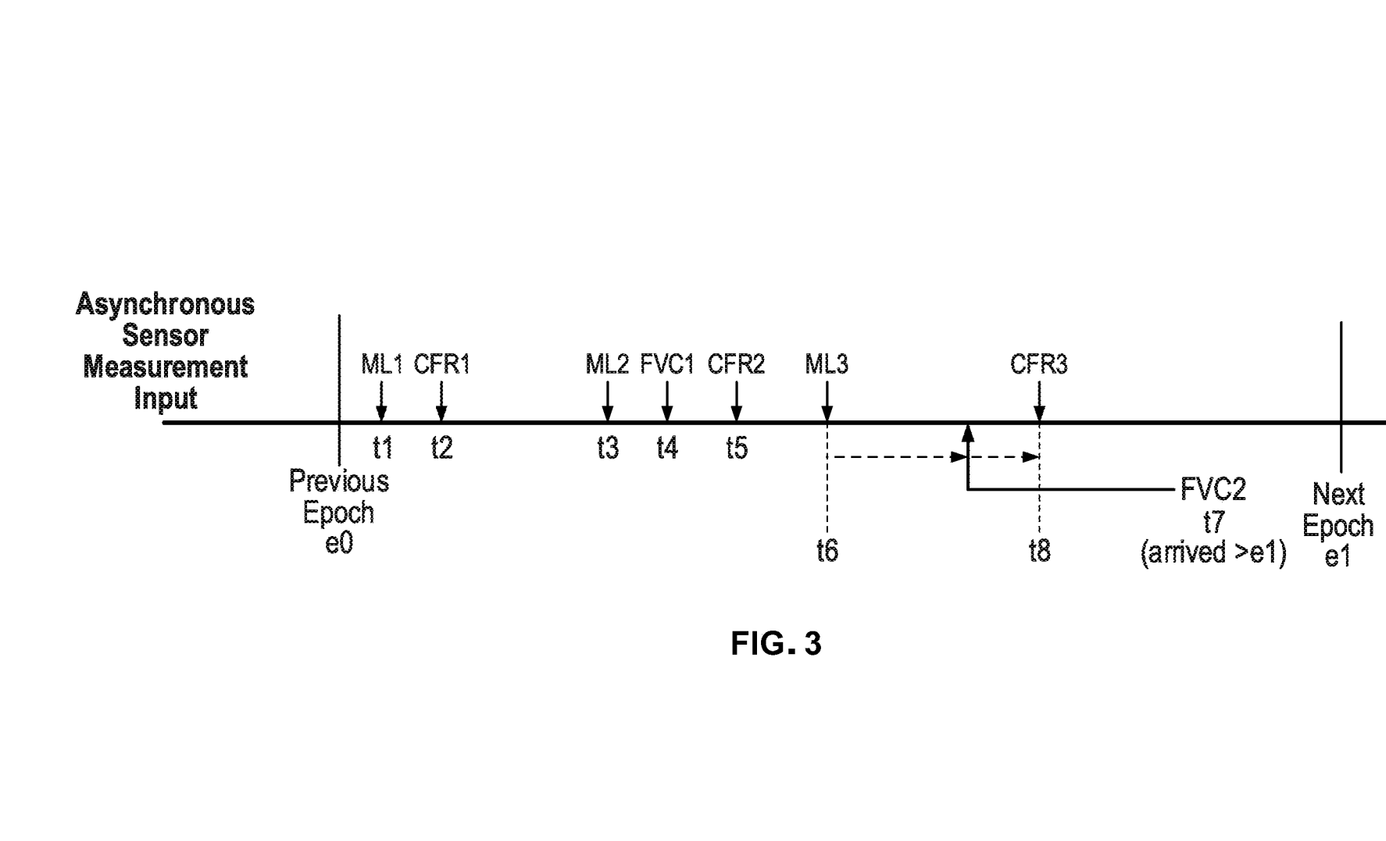
FIG. 3 is a timeline illustrating reception and storage of late sensor measurements in accordance with embodiments of the disclosure.

FIG. 3 is a timeline illustrating reception and storage of late sensor measurements in accordance with embodiments of the disclosure. As above, in embodiments of the disclosure, sensor measurements may arrive at a processing unit in asynchronous manner and in any order. Each measurement has an associated time index at which the measurement is made or output from its sensor. Object fusion or other operations may be performed on these measurements in temporal order of their time indices. That is, if measurements arrive out of time index order (e.g., earlier-taken measurements arrive after later-taken measurements), late-arriving measurements are rearranged in their proper time index order.

Measurements may be analyzed, and algorithm information generated, for each measurement received. In some embodiments, updated algorithm information, such as state information, may be used by other systems only at specific intervals. For example, updated algorithm information may be transmitted at the end of each epoch e0, e1. That is, algorithm information may be calculated on a rolling (or other) basis as measurements arrive, but only transmitted to other systems at certain times such as at specified intervals. In the example of FIG. 3, algorithm information may be calculated or updated for each arriving measurement, with the latest algorithm information transmitted to other vehicle 100 systems at the end of each epoch e0, e1. In some embodiments, algorithm information, including state information and intermediate values, may be stored along with each measurement. That is, the algorithm information resulting from each measurement may be stored along with that measurement, such that algorithm information is stored in the same temporal order as the measurements and updated in the same manner. Algorithm information may be stored in the same or separate storage or data structure.

Accordingly, in operation, a processor of vehicle 100 may receive sensor measurements from its onboard sensors at certain times, as shown. Vehicle 100 may then store and process these measurements in order. Embodiments of the disclosure contemplate any method and structure by which sensor measurements may be stored and subsequently processed. In some embodiments, vehicle 100 may store each measurement in, e.g., a buffer of a vehicle 100 onboard memory. The buffer may be constructed and operate in any suitable manner. In some embodiments, the buffer may be a first in first out (FIFO) buffer, with sensor measurements pushed onto the buffer in temporal order of their time indices. When a late measurement is received, its location in the buffer may be determined according to its time index, e.g., the late measurement is inserted into the buffer at a position that preserves the temporal order of the time indices of the stored measurements. For instance, temporally later measurements may be popped off the buffer and stored, such as in a separate buffer, the late measurement may be pushed onto the buffer, and the temporally later measurements may then be popped off the separate buffer and pushed back onto the FIFO buffer in order. In this manner, the late-arriving sensor measurement is inserted into the FIFO buffer in the correct temporal order of time indices.

In the example of FIG. 3, a first measurement ML1 arrives from the main LiDAR module ML, taken at time t1, followed by a first measurement CFR1 taken by center front radar module CFR1 at time t2>t1. This is followed by, in order, a second LiDAR measurement ML2 taken or generated at time t3, a forward vision camera FVC measurement FVC1 taken at time t4, a second CFR measurement CFR2 taken at time t5, a third LiDAR measurement ML3 taken at time t6, and a third CFR measurement CFR3 taken at time t8. Here, t8>t6>t5>t4>t3>t2, such that these measurements arrive in the temporal order in which they were taken or generated. These measurements may be processed in the order in which they arrive, e.g., each is used to generate state information of vehicle 100 as it arrives. At end of epoch, i.e., at time e1, state information may be extrapolated from time t8 to time e1, and this extrapolated state information is transmitted or reported to the appropriate systems of vehicle 100 for any desired purpose, such as navigation or the like.

After the end of epoch e1, a measurement may arrive late. For example, a second FVC measurement FVC2 may have been taken at time t7 where t6<t7<t8, but measurement FVC2 may not have arrived until after the end of epoch e1. Measurement FVC2 may then be inserted in order of its time index t, between ML3 (t6) and CFR3 (t8). As above, for instance, if measurements are stored in a buffer, measurement FVC2 may be inserted into the buffer between measurements ML3 and CFR3. State information may then be extrapolated from ML3 at t6 and employed along with measurement FVC2, and previously calculated intermediate values, to determine new state information at time t7. This new state information may then be propagated forward to revise all subsequent states, i.e., state information at time t7 may be extrapolated to time t8 and used along with CFR3 to determine revised state information for time t8, which in turn may then be extrapolated to time e1 to determine a revised end-of-epoch e1 state. In this manner, late-arriving measurements may be placed in their proper time index order and used to recalculate state information which may then be propagated forward to determine a revised current or most recent state. While this revised state is determined after the end of epoch e1, the revised state information is used in subsequent calculations to achieve more accurate state information at the end of epoch e2. In addition, the revised state information may also be used for any other desired purpose, such as use of state information for test or debugging purposes, use in systems that do not require results to be generated in real time, or the like.

Figure 4:
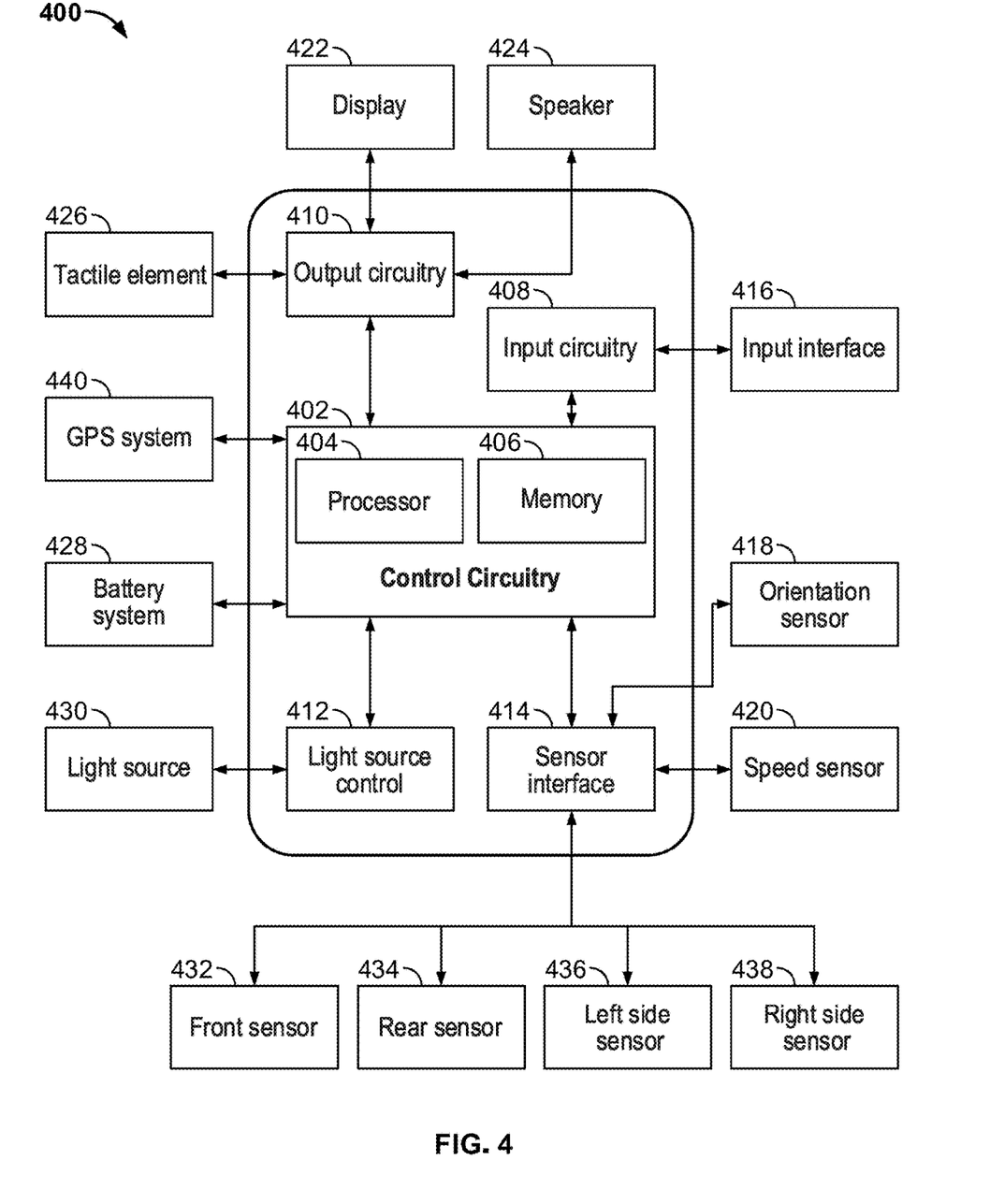
FIG. 4 shows a block diagram of components of a system of a vehicle for determining drivable space, in accordance with some embodiments of the present disclosure.

Methods of embodiments of the disclosure may be implemented in any system that employs late-fusion of sensor measurements. As one example, vehicles such as autonomous vehicles may have cameras and other sensors built thereinto or thereon, to capture images and other measurements of its surroundings. Processing circuitry of the vehicle, or remote processing circuitry, may then implement the above described methods and processes to analyze late-arriving sensor measurements. FIG. 4 shows a block diagram of components of a system of one such vehicle 400, in accordance with some embodiments of the present disclosure. Vehicle 400 may correspond to vehicle 100 of FIG. 1. Vehicle 400 may be a car (e.g., a coupe, a sedan, a truck, an SUV, a bus), a motorcycle, an aircraft (e.g., a drone), a watercraft (e.g., a boat), or any other type of vehicle.

Vehicle 400 may comprise control circuitry 402 which may comprise processor 404 and memory 406. Processor 404 may comprise a hardware processor, a software processor (e.g., a processor emulated using a virtual machine), or any combination thereof. In some embodiments, processor 404 and memory 406 in combination may be referred to as control circuitry 402 of vehicle 400. In some embodiments, processor 404 alone may be referred to as control circuitry 402 of vehicle 400. Memory 406 may comprise hardware elements for non-transitory storage of commands or instructions, that, when executed by processor 404, cause processor 404 to operate the vehicle 400 in accordance with embodiments described above and below. Control circuitry 402 may be communicatively connected to components of vehicle 400 via one or more wires, or via wireless connection.

Control circuitry 402 may be communicatively connected to input interface 416 (e.g., a steering wheel, a touch screen on display 424, buttons, knobs, a microphone or other audio capture device, etc.) via input circuitry 408. In some embodiments, a driver of vehicle 400 may be permitted to select certain settings in connection with the operation of vehicle 400 (e.g., color schemes of the urgency levels of FIG. 3, manners of presentation of the suggested steering indicator, when to provide the suggested steering indicator, etc.). In some embodiments, control circuitry 402 may be communicatively connected to GPS system 440 of vehicle 400, where the driver may interact with the GPS system via input interface 416. GPS system 440 may be in communication with multiple satellites to ascertain the driver's location and provide navigation directions to control circuitry 402.

Control circuitry 402 may be communicatively connected to display 422 and speaker 424 by way of output circuitry 410. Display 422 may be located at a dashboard of vehicle 400 (e.g., dashboard 204 and/or dashboard 208 of FIG. 2) and/or a heads-up display at a windshield (e.g., windshield 206 of FIG. 2) of vehicle 400. For example, the GUIs of FIG. 3 may be generated for display at display 422, and display 422 may comprise an LCD display, an OLED display, an LED display, or any other type of display. Speaker 424 may be located at any location within the cabin of vehicle 400, e.g., at the dashboard of vehicle 400, on an interior portion of the vehicle door. Display 422 and speaker 424 may provide visual and audio feedback, respectively, in connection with providing a suggested steering action indicator to a driver of vehicle 400 to turn vehicle 400 towards a side to avoid an obstacle or non-drivable space.

Control circuitry 402 may be communicatively connected to tactile element 426 via output circuitry 410. Tactile element 426 may be a mechanical device, e.g., comprising actuators configured to vibrate to cause a tactile or haptic sensation of the body of the driver. The tactile element may be located at one or more of a variety of locations in vehicle 400 (e.g., on a driver's seat, a passenger seat, steering wheel, brake pedals, and/or gas pedals) to provide haptic feedback in connection with providing a suggested steering action indicator to a driver of vehicle 400 to turn vehicle 400 towards the side to avoid the first obstacle.

Control circuitry 402 may be communicatively connected (e.g., by way of sensor interface 414) to sensors (e.g., front sensor 432, rear sensor 434, left side sensor 436, right side sensor 438, orientation sensor 418, speed sensor 420). Orientation sensor 418 may be an inclinometer, an accelerometer, a tiltmeter, any other pitch sensor, or any combination thereof and may be configured to provide vehicle orientation values (e.g., vehicle's pitch and/or vehicle's roll) to control circuitry 402. Speed sensor 420 may be one of a speedometer, a GPS sensor, or the like, or any combination thereof, and may be configured to provide a reading of the vehicle's current speed to control circuitry 402.

In some embodiments, front sensor 432 may be positioned at a variety of locations of vehicle 400, and may be one or more of a variety of types, e.g., an image sensor, an infrared sensor, an ultrasonic sensor, a radar sensor, LED sensor, LIDAR sensor, etc., configured to capture an image or other position information of a nearby object such as a vehicle (e.g., by outputting a light or radio wave signal, and measuring a time for a return signal to be detected and/or an intensity of the returned signal, and/or performing image processing on images captured by the image sensor of the surrounding environment of vehicle 400).

Control circuitry 402 may be communicatively connected to battery system 428, which may be configured to provide power to one or more of the components of vehicle 400 during operation. In some embodiments, vehicle 400 may be an electric vehicle or a hybrid electric vehicle.

Control circuitry 402 may be communicatively connected to light source 430 via light source control 412. Light source 430 may be, e.g., a series of LEDs, and may be located at one or more of a variety of locations in vehicle 400 to provide visual feedback in connection with providing suggested steering action indicator to a driver of vehicle 400 to turn vehicle 400 towards a side to avoid the first obstacle.

It should be appreciated that FIG. 4 only shows some of the components of vehicle 400, and it will be understood that vehicle 400 also includes other elements commonly found in vehicles (e.g., electric vehicles), e.g., a motor, brakes, wheels, wheel controls, turn signals, windows, doors, etc.

Figure 5:
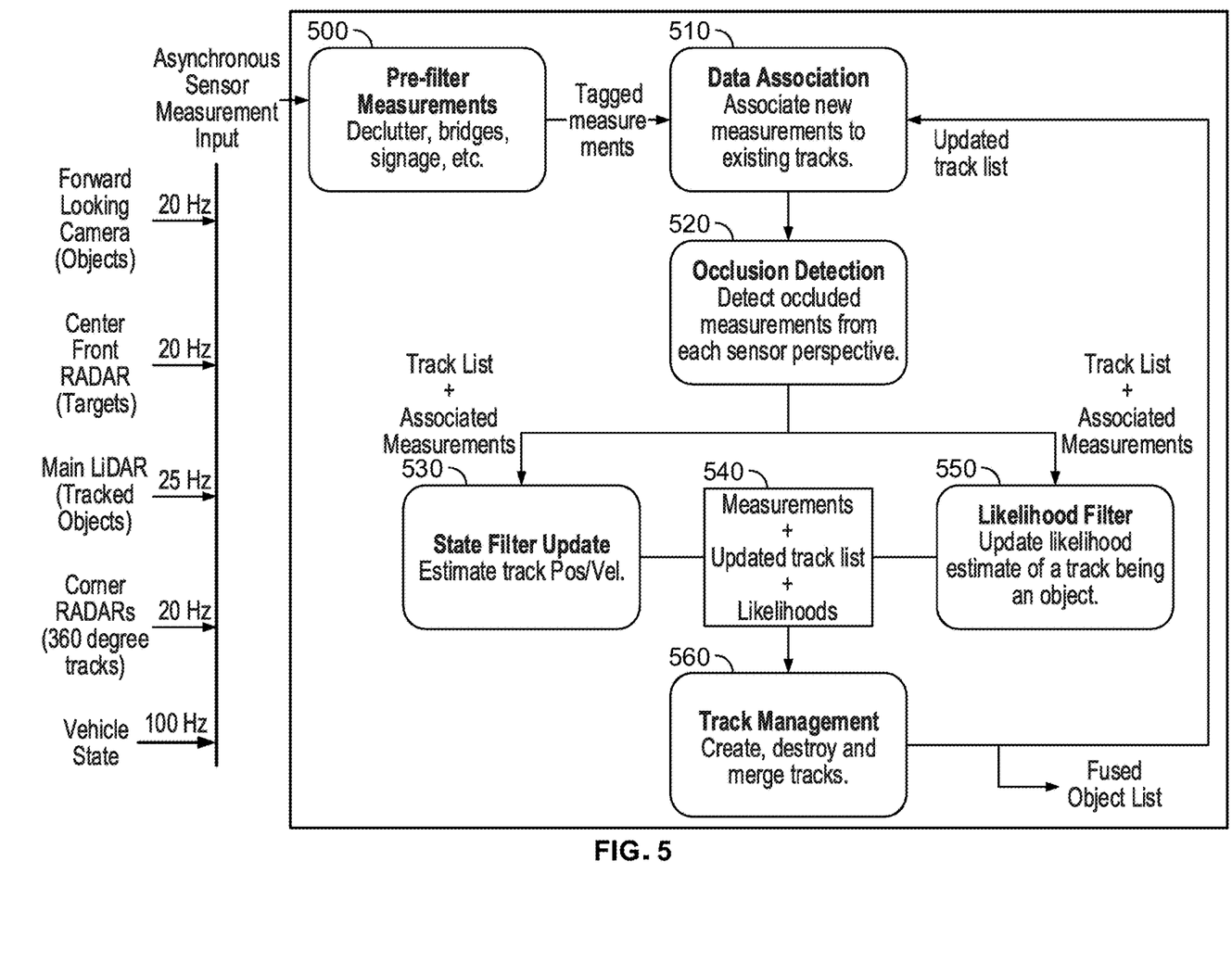
FIG. 5 is a block diagram of logical components of a system for asynchronous late-fusion of measurements in accordance with embodiments of the disclosure.

FIG. 5 is a block diagram of logical components of a system for asynchronous late-fusion of measurements in accordance with embodiments of the disclosure. In some embodiments of the disclosure, each component or block of FIG. 5 may represent one or more modules or sets of instructions stored in, e.g., memory 406 and executed by processor 404. FIG. 5 also describes exemplary functions of each module, and data paths therebetween. Here, a pre-filter measurements module 500 may filter and condition output measurement signals from sensors. Module 500 may pre-filter signals in any manner, such as by performing decluttering of images, reducing noise, and the like. Filtered measurements are then transmitted to a data association module 510, which determines whether new measurements are to be associated with existing tracks or detected objects. Once association is complete and object positions are properly determined, measurements are sent to an occlusion detection module 520 to determine measurements that may correspond to occluded or partially occluded areas. In some embodiments, occlusion may be determined separately from each sensor's perspective, and may result in differing treatment of objects according to whether they are determined to be occluded or not. Occlusion detection and treatment are further described in connection with FIG. 7 below.

Sensor measurements and a track list of detected objects are then transmitted to a state filter update module 530 and a likelihood filter 550. The state filter update module 530 determines state information from received sensor measurements and may employ any of the late-fusion methods described herein, to determine state information for both timely and late-arriving sensor measurements. State filter update module 530 may determine any state information from received sensor measurements, by any methods or processes. For example, in some embodiments, state filter update module 530 may determine position, velocity, direction or heading, and the like, for any detected object or track. In some embodiments, module 530 may determine quantities such as object size, shape, and extent. Module 530 may calculate any quantities or properties of any object that may be determined from any one or more input sensor measurements. Algorithm information may be calculated in any suitable manner employing any methods, such as estimation via, e.g., an extended Kalman filter method which determines object states and associated covariances, which can include one or more intermediate values. Propagation of states may also be performed in any suitable manner, such as via a motion model.

Likelihood filter 550 updates likelihood estimates of a track being an object, i.e., determines whether received sensor measurements correspond to an actual physical object or not. These determinations may be performed in any suitable manner, using any suitable methods, such as by Bayesian filtering or the like. Likely objects are then transmitted to module 540, along with output from state filter update module 530, for appending and transmission to track management module 560. Track management module 560 creates, destroys, and/or merges tracks, or detected objects, to output those objects that are likely real objects, and their likely properties, e.g., positions, velocities, etc. Track management may be performed in any suitable manner. For example, unassociated measurements, or measurements resulting in detection of a new object, may be used to create a new track. Track management module 560 may also delete tracks or objects that are no longer detected, for example have not received any new measurements for more than some predetermined amount of time (e.g., 100 ms). Track management module 560 may also merge tracks. For instance, module 560 may consider two objects as the same object if two different sensors each detect objects that are sufficiently close to each other in position. That is, detected objects that are determined to be sufficiently close to each other are determined to be the same object, and their tracks are accordingly merged together, to remove duplicates. Track merging may be performed in any suitable manner, such as by employing methods such as mean shift clustering and the like. The output of module 560 may thus include an updated object list containing updated values of most likely objects and their properties such as positions and velocities. This object list may be transmitted to other systems of vehicle 100 for any purposes, such as use in route planning, navigation, and the like. The object list may also be returned to data association module 510, where the above described process may be repeated to update the track list with newly received sensor measurements. In this manner, vehicle 100 may continually and repeatedly detect surrounding objects, for any purpose.

Figure 6:
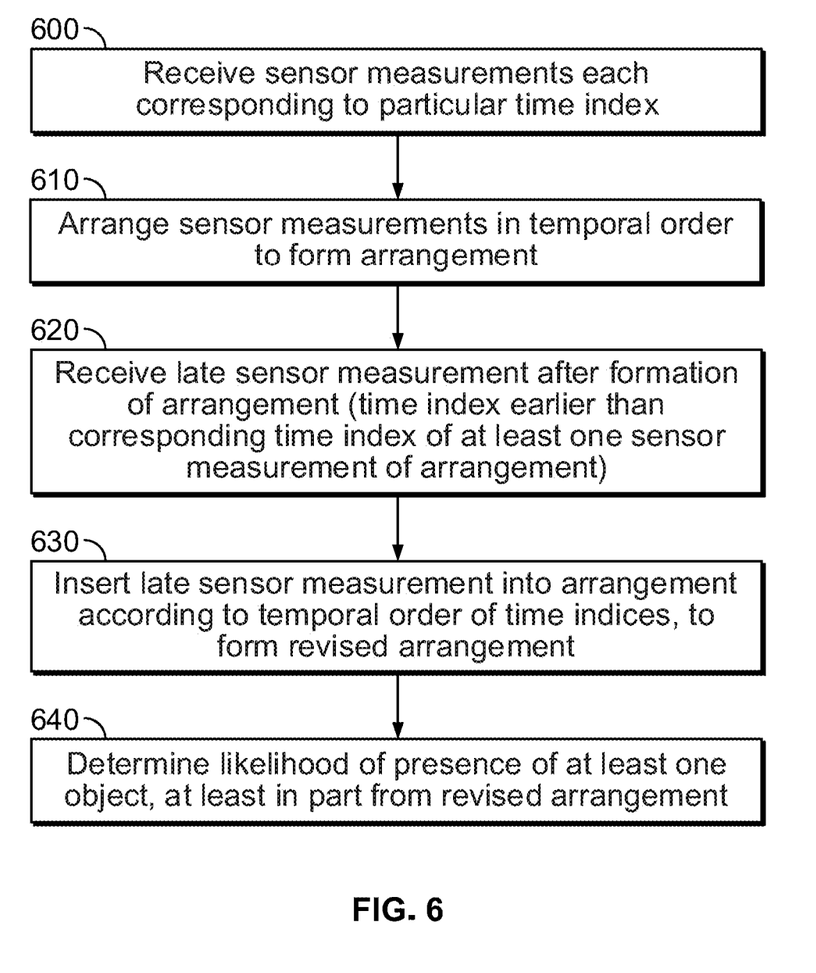
FIG. 6 is a flowchart illustrating exemplary methods for asynchronous late-fusion of measurements in accordance with embodiments of the disclosure.

FIG. 6 is a flowchart illustrating exemplary methods for asynchronous late-fusion of measurements in accordance with embodiments of the disclosure. In some embodiments, the flowchart of FIG. 6 can be implemented by state filter update 530. The processes of embodiments of the disclosure may initially receive sensor measurements each corresponding to a particular time index (Step 600), such as measurements from the above described vehicle 100 sensors CFR, ML, FVC, and/or any other sensors supported by vehicle 100. Processor 404 may then arrange these sensor measurements in temporal order of their time indices (Step 610) and determine any desired algorithm information, including state information and one or more intermediate values, from these measurements. Processor 404 may at some point receive a late sensor measurement after arrangement of previously arrived measurements, where this late-arriving measurement has a time index earlier than the time index of at least one other previously arrived measurement (Step 620). That is, the late-arriving measurement may have been taken prior to another already-arrived measurement. In this case, the late sensor measurement is inserted into the arrangement in temporal order of time indices, so that the updated arrangement contains sensor measurements arranged in temporal order of time index, regardless of when the measurements were received (Step 630). Processor 404 may then determine the likelihood of the presence of at least one object, at least in part from the revised or updated arrangement (Step 640). More specifically, state information may be updated from the late-arriving measurement, and one or more previously calculated intermediate values, and propagated forward to generate updated most-recent state information.

In this manner, it may be observed that methods of embodiments of the disclosure allow for algorithm information to be calculated from sensor measurements that are transmitted and received asynchronously, in any order, from any sensor types. Late-arriving measurements from any sensor are simply inserted into the correct temporal order, and state information is revised and propagated forward accordingly. Sensors can be swapped out for different types, or their timing altered, without need for reprogramming or altering the methods described herein. Accordingly, state information may be calculated more reliably, and efficiently, and in more modular fashion that allows for changes to sensors without excessive reprogramming or other alterations to systems of the disclosure.

Figure 7:
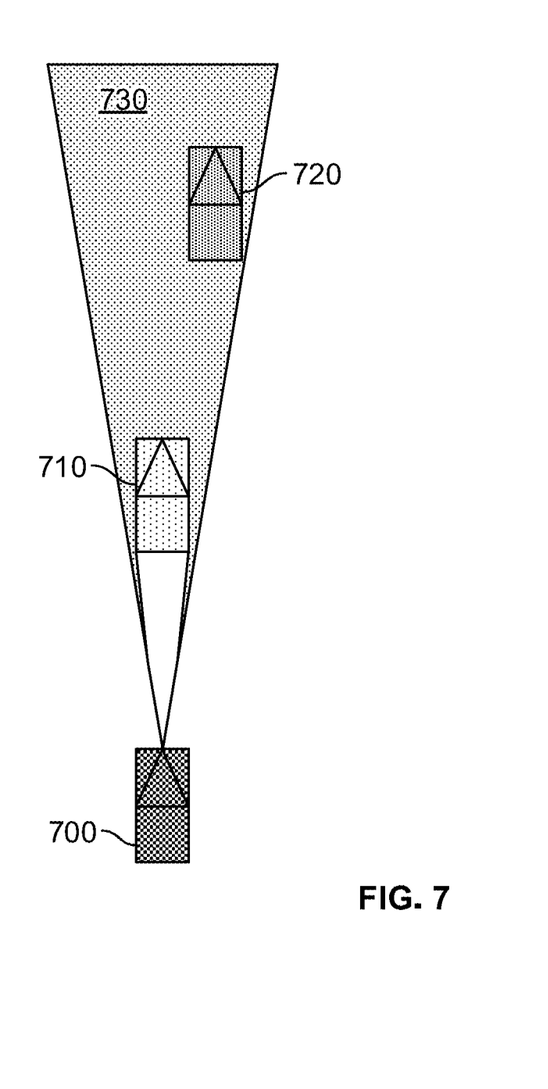
FIG. 7 is a top view conceptually illustrating determination of occlusion regions in accordance with embodiments of the disclosure.

Embodiments of the disclosure also contemplate determination of occlusion regions from detected objects. FIG. 7 is a top view conceptually illustrating determination of occlusion regions in accordance with embodiments of the disclosure. A vehicle 700 may determine the location of another vehicle 710, which may be positioned ahead, as shown. The position of vehicle 710 may be determined from vehicle 700 sensor measurements, with late-arriving measurements being used to revise the calculated vehicle 710 position as above. The vehicle 710 occludes the view from vehicle 700, blocking the line of sight of observers or sensors from vehicle 700 and generated an occlusion region 730 as shown. Objects entering this occlusion region 730, such as vehicle 720, cannot be seen from vehicle 700, and their position may thus not be readily determined therefrom.

Once the position of vehicle 710 is determined, rays may be extended from the location of the sensor used to determine this position, past the outermost edges of the vehicle 710, thus determining occlusion region 730. In some embodiments of the disclosure, an occlusion region may be separately calculated for each sensor of vehicle 700, as each sensor may have a different location on vehicle 700.

Objects detected as being within or entering occlusion region 730 may be treated differently by vehicle 700 as compared to detected objects outside region 730. For example, likelihood filter 550 may halt likelihood estimate updates for occluded objects 720, as sensor data may be unreliable. Similarly, track management module 560 may delete tracks of objects entering occlusion region 730, or may stop merging any tracks that are positioned within occlusion region 730, as the state of any occluded objects 720 may be deemed too unreliable or unable to be detected with sufficient accuracy.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, embodiments of the disclosure may update state information according to any sensor measurements arriving at any times, in any order. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
    calculating, using processing circuitry and for each sensor measurement of a set of sensor measurements having respective time indexes, state information of an object, and one or more intermediate values;
    receiving, subsequent to the calculating, a third sensor measurement having a time index temporally later than a first time index of a first sensor measurement and earlier than a second time index of a second sensor measurement, of the set of sensor measurements; and
    recalculating state information of the object for the second time index of the second sensor measurement based on the third sensor measurement and based on the one or more intermediate values calculated for the second sensor.

2. The method of claim 1, wherein the first time index and the second time index each correspond to a first epoch of time, and wherein the receiving further comprises receiving the third sensor measurement during a second epoch of time occurring after the first epoch of time.

3. The method of claim 1, wherein each sensor measurement of the set of sensor measurements has a corresponding time index, and wherein the method further comprises storing the set of sensor measurements in a buffer, in a temporal order of the respective time indices.

4. The method of claim 3, further comprising storing the third sensor measurement in the buffer, between the first sensor measurement and the second sensor measurement.

5. The method of claim 1, wherein the set of sensor measurements and the third sensor measurement are measurements from sensors of a vehicle.

6. The method of claim 1, wherein the set of sensor measurements and the third sensor measurement are one or more of radio detection and ranging (radar) measurements, Light Detection and Ranging (LiDAR) measurements, or images.

7. The method of claim 1, wherein the state information of the object comprises one or more of an object position, object velocity, object heading, or object acceleration.

8. The method of claim 1, wherein the one or more intermediate values comprises one or more values determined based on matrix multiplication or an inverse of a matrix.

9. The method of claim 1, further comprising determining an occlusion region for the object.

10. A system comprising:
    a storage device; and
    processing circuitry configured to:
        calculate, for each sensor measurement of a set of sensor measurements having respective time indexes, state information of an object, and one or more intermediate values;
        receive, subsequent to calculation of the state information, a third sensor measurement having a time index temporally later than a first time index of a first sensor measurement and earlier than a second time index of a second sensor measurement, of the set of sensor measurements; and
        recalculate state information of the object for the second time index of the second sensor measurement based on the third sensor measurement and based on the one or more intermediate values calculated for the second sensor measurement.

11. The system of claim 10, wherein the first time index and the second time index each correspond to a first epoch of time, and wherein the receiving further comprises receiving the third sensor measurement during a second epoch of time occurring after the first epoch of time.

12. The system of claim 10, wherein each sensor measurement of the set of sensor measurements has a corresponding time index, and wherein the processing circuitry is further configured to store the set of sensor measurements in a buffer of the storage device, in a temporal order of the respective time indices.

13. The system of claim 12, wherein the processing circuitry is further configured to store the third sensor measurement in the buffer, between the first sensor measurement and the second sensor measurement.

14. The system of claim 10, wherein the set of sensor measurements and the third sensor measurement are measurements from sensors of a vehicle.

15. The system of claim 10, wherein the set of sensor measurements and the third sensor measurement are one or more of radio detection and ranging (radar) measurements, Light Detection and Ranging (LiDAR) measurements, or images.

16. The system of claim 10, wherein the state information of the object comprises one or more of an object position, object velocity, object heading, or object acceleration.

17. The system of claim 10, wherein the one or more intermediate values comprises one or more values determined based on matrix multiplication or an inverse of a matrix.

18. The system of claim 10, wherein the processing circuitry is further configured to determine an occlusion region for the object.

19. A vehicle, comprising:
a vehicle body;
processing circuitry coupled to the vehicle body and configured to:
  calculate, for each sensor measurement of a set of sensor measurements having respective time indexes, state information of an object, and one or more intermediate values;
  receive, subsequent to calculation of the state information, a third sensor measurement having a time index temporally later than a first time index of a first sensor measurement and earlier than a second time index of a second sensor measurement, of the set of sensor measurements; and
  recalculate state information of the object for the second time index of the second sensor measurement based on the third sensor measurement and based on the one or more intermediate values calculated for the second sensor measurement.

20. The vehicle of claim 19, wherein the set of sensor measurements and the third sensor measurement are one or more of radio detection and ranging (radar) measurements, Light Detection and Ranging (LiDAR) measurements, or images.

* * * * *